M. W. MURRAY.
PROCESS OF MANUFACTURING GAS.
APPLICATION FILED JUNE 6, 1912.

1,056,045.

Patented Mar. 18, 1913.

WITNESSES
Harry C. Heebig
Minnie S. Miller

INVENTOR
Michael W. Murray
BY Frank M. Ashley
ATTORNEY

UNITED STATES PATENT OFFICE.

MICHAEL W. MURRAY, OF NEW YORK, N. Y., ASSIGNOR OF ONE-HALF TO GEORGE H. ROSENBLATT, OF NEW YORK, N. Y.

PROCESS OF MANUFACTURING GAS.

1,056,045. Specification of Letters Patent. Patented Mar. 18, 1913.

Application filed June 6, 1912. Serial No. 702,011.

*To all whom it may concern:*

Be it known that I, MICHAEL W. MURRAY, a citizen of the United States, and a resident of New York city, in the county of New York and State of New York, have invented certain new and useful Improvements in Processes of Manufacturing Gas, of which the following is a specification.

This invention relates to the manufacture of gas and has for its object to devise a process for disassociation of water vapor or other gases for the purpose of obtaining therefrom a gas having combustible properties.

When water vapor or steam is subjected to a very high temperature, it is disassociated according to the equation $2H_2O = 2H_2 + O_2$. Also a gas for instance as $CO_2$ when subjected to a very high temperature is disassociated according to the equation $2CO_2 = 2CO + O_2$. This disassociation is facilitated in the presence of a catalytic agent such as a metal heated to a high temperature. The extent of the disassociation is also dependent upon the pressure.

I propose to devise a process for disassociating water vapor or other gases on a commercial scale whereby the disassociated gases may be obtained and used in any desired manner as for instance in the use for purposes of combustion. In carrying out this process, I introduce preferably dry steam under pressure into a chamber where it is subjected to the heat of an electric arc, in the presence of a catalytic agent. The steam is introduced through the arc in such a manner that all of it is subjected to the high temperature thereof and is thus disassociated and then the disassociated gases are conducted away to a water seal whence they may be conducted to any desired point for consumption.

The catalytic agent consists preferably of a refractory metal which may be formed as a cap for the tips of the electrodes of the arc.

I have illustrated the preferred forms of apparatus for carrying out the above process, but it may be understood that other forms of apparatus may be used without departing from the spirit of this invention.

Figure 1:
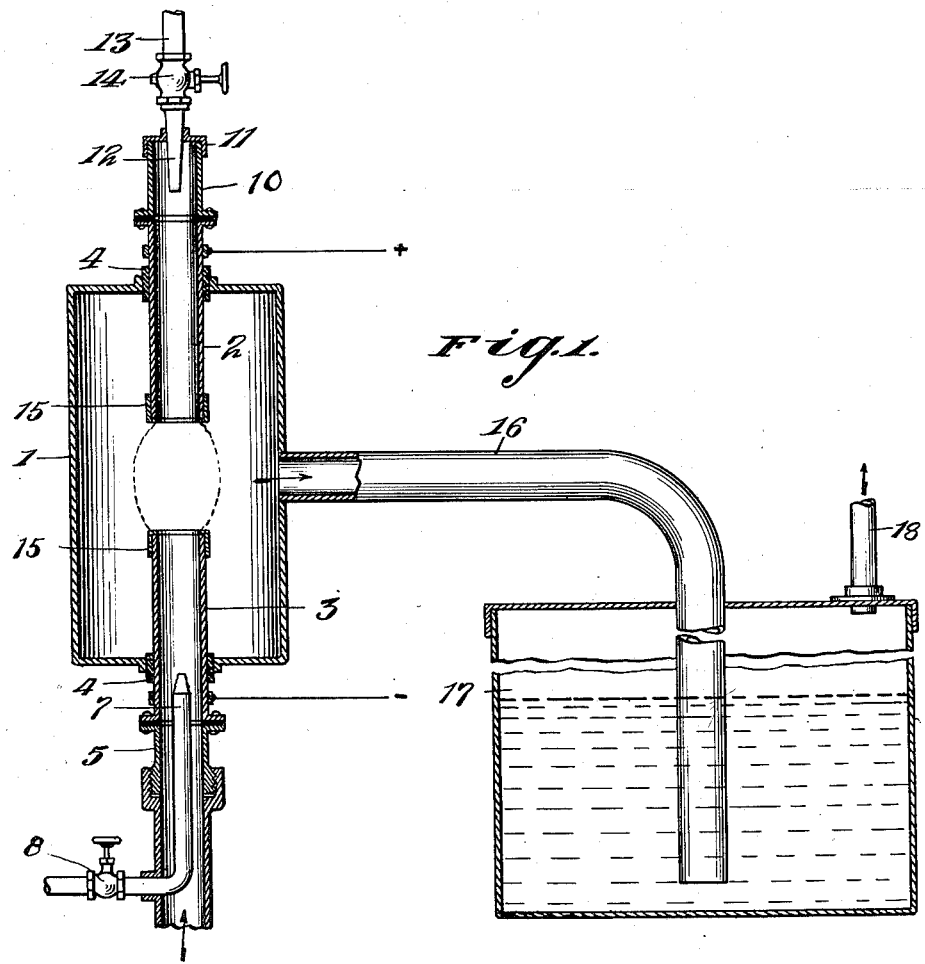
Figure 2:
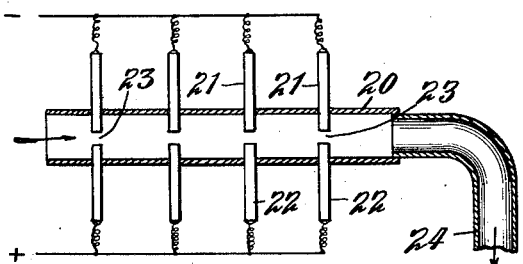
Figure 3:
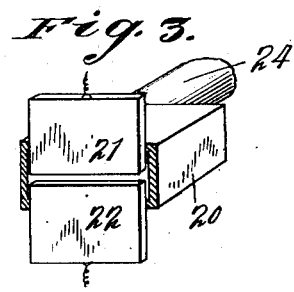

In the accompanying drawings Figure 1 is a sectional elevation illustrating one form of my apparatus. Fig. 2 is a sectional elevation illustrating another form of my apparatus, and Fig. 3 is a perspective view cut away so as to illustrate the proportions of the electrodes of the arcs shown in Fig. 2.

Referring to the form illustrated in Fig. 1, a refractory chamber 1 is formed with apertures at its opposite ends through which project tubular electrodes 2 and 3 through suitable bushings 4. Connected to the electrode 3 and suitably insulated therefrom is a pipe 5 which communicates with some source of preferably dry steam supply under pressure of say fifty or sixty pounds above atmosphere. Electrode 2 has connected thereto and suitably insulated therefrom, a pipe 10 closed by cap 11, into which projects a suitable nozzle 12 leading from pipe 13. The latter may be connected to a source of supply of any desired liquid such as a hydro-carbon, the flow of which may be controlled by valve 14. This hydro-carbon is vaporized and then disassociated together with the steam with which it is intimately mixed.

If desired the hydro-carbon may be sprayed into the chamber through nozzle 7 which projects into the tubular electrode 3 into which the steam is introduced. The sprayed liquid will intimately mix with the steam and will together therewith be subjected to the action of the arc. The flow of liquid through the nozzle 7 may be controlled by any suitable means as a valve 8.

Leading from the chamber 1 is a pipe 16 communicating with a water seal 17 having a pipe 18 leading from the top thereof to any suitable point where the gas delivered from the chamber 1 is to be used. As the vapor or gas passes through the arc, it is disassociated by reason of the high temperature to which it is subjected and the products of this disassociation pass off through the pipe 16 and the water seal and this may be conducted away to any point of consumption as heretofore pointed out. The gas to be disassociated may be introduced from the upper or lower electrode or from both simultaneously as may be desired. The tips of the electrodes 2 and 3 may be covered by some suitable metal cap 15 which may be of tungsten or the like in order to withstand the high temperature of the arc and to act as a catalytic agent to accelerate the disassociation. Some of the oxygen will combine with the metal of the electrode and thus permit a considerable proportion of hydrogen to remain free after disassociation.

It will be noted that by reason of the tubular form of the electrode all of the vapor or gas is subjected to the temperature of the arc as it passes out from the interior to the exterior of the electrode into which said vapor or gas is introduced.

Referring to the form of my invention illustrated in Figs. 2 and 3, the refractory chamber 20 has mounted therein a plurality of electrodes 21 and 22, each of which extends the full width of the chamber 20 presenting a narrow gap 23 through which the gas to be disassociated must pass. After the latter is so disassociated, it may be conducted away through a pipe 24 in the same manner as illustrated in the form shown in Fig. 1.

I preferably use dry steam at a pressure of between fifty or sixty pounds above atmosphere. The disassociation is carried out more thoroughly at high pressures. However, I do not desire to limit myself to any particular pressure as lower pressures will in a measure produce the desired disassociation.

Having thus described my invention, I claim as new:

1. A process for disassociating steam or other gases consisting in passing said steam or other gases through a tubular member forming the electrode of an arc and subjecting same to the temperature of the arc by which it is surrounded at all sides.

2. The process of manufacturing gas consisting in subjecting steam and a hydro-carbon to the action of an electric arc in the presence of a catalytic agent.

3. The process of manufacturing gas which consists in passing steam under pressure through an electric arc in the presence of a catalytic agent and spraying a hydro-carbon into said steam to intimately mix therewith and to be subjected to the action of the arc simultaneously therewith.

4. The process of manufacturing gas consisting in passing steam under pressure through an electric arc in the presence of a catalytic agent so as to disassociate the steam and causing the gases formed by this disassociation to pass through a water seal.

5. The process of manufacturing gas consisting in passing steam under pressure together with a hydro-carbon sprayed therein through an electric arc in the presence of a catalytic agent so as to be disassociated into component gases and causing the latter to pass through a water seal.

Signed at New York city, in the county of New York, and State of New York, this 29th day of May A. D. 1912.

MICHAEL W. MURRAY.

Witnesses:
MINNIE S. MILLER,
WILLIAM JACKSON.